United States Patent
Wegemann et al.

(10) Patent No.: US 9,109,941 B2
(45) Date of Patent: Aug. 18, 2015

(54) MICROWAVE EMITTER AND LEVEL MEASURING DEVICE

(75) Inventors: Uwe Wegemann, Sprockhoevel (DE); Peter Angerstein, Oberhausen (DE); Michael Deilmann, Essen (DE)

(73) Assignee: KROHNE Messtechnik GmbH, Duisburg (DE)

( * ) Notice: Subject to any disclaimer, the term of this patent is extended or adjusted under 35 U.S.C. 154(b) by 689 days.

(21) Appl. No.: 13/369,714

(22) Filed: Feb. 9, 2012

(65) Prior Publication Data
US 2012/0206290 A1    Aug. 16, 2012

(30) Foreign Application Priority Data
Feb. 9, 2011   (DE) .......................... 10 2011 010 801

(51) Int. Cl.
| | |
|---|---|
| G01S 13/08 | (2006.01) |
| G01F 23/284 | (2006.01) |
| H01P 3/08 | (2006.01) |
| H01P 3/12 | (2006.01) |
| H01P 3/16 | (2006.01) |

(52) U.S. Cl.
CPC .............. *G01F 23/284* (2013.01); *H01P 3/082* (2013.01); *H01P 3/122* (2013.01); *H01P 3/16* (2013.01)

(58) Field of Classification Search
CPC ........... H01P 3/082; H01P 3/122; H01P 3/16; G01F 23/284
USPC .......................................................... 342/124
See application file for complete search history.

(56) References Cited

U.S. PATENT DOCUMENTS

| | | | | |
|---|---|---|---|---|
| 3,593,224 A | * | 7/1971 | Eggers et al. ................. | 333/252 |
| 4,016,506 A | * | 4/1977 | Kofol .............................. | 331/96 |
| 5,070,730 A | * | 12/1991 | Edvardsson ............... | 73/290 V |
| 5,495,218 A | * | 2/1996 | Erb et al. ...................... | 333/248 |
| 5,954,526 A | * | 9/1999 | Smith .......................... | 439/136 |
| 6,295,018 B1 | * | 9/2001 | Diede et al. .................... | 342/124 |
| 6,553,830 B2 | * | 4/2003 | Fahrenbach et al. ........ | 73/290 V |
| 6,987,481 B2 | | 1/2006 | Fehrenbach et al. | |
| 2002/0067229 A1 | * | 6/2002 | Lubbers ....................... | 333/252 |
| 2006/0144800 A1 | * | 7/2006 | Barreras et al. ............... | 210/744 |

FOREIGN PATENT DOCUMENTS

WO    02/16889 A1    2/2002

OTHER PUBLICATIONS

Wikipedia article, "Microwave", Feb. 6, 2011 version.*

* cited by examiner

*Primary Examiner* — Frank J McGue
(74) *Attorney, Agent, or Firm* — Roberts Mlotkowski Safran & Cole, P.C.; David S. Safran

(57) ABSTRACT

A microwave transmitting device for a level measuring device (1) having an electronic device, a microwave emitter and a waveguide (3). The inside of the waveguide is filled with a casting compound. A microwave transmitting device that is particularly compact and cost-effective is implemented by the microwave emitter and the electronic device being enclosed by a casting formed of a casting/potting compound.

3 Claims, 2 Drawing Sheets

MICROWAVE EMITTER AND LEVEL MEASURING DEVICE

BACKGROUND OF THE INVENTION

1. Field of the Invention

The invention relates to a microwave transmitting device for a level measuring device with an electronic device, a microwave emitter and a waveguide, wherein the inside of the waveguide is cast with casting compound. The invention relates further to a level measuring device having such a microwave transmitting device.

2. Description of Related Art

Level measuring devices are normally used to monitor the level of liquids or bulk solids in containers. The methods for measurement used in this case are diverse and include, for example, mechanical measurement methods, such as float gauges or vibration sensors, but also capacitive, conductive and optical measurement methods. The methods used for measurement are differentiated into contact and non-contact measurement methods. Radar technology in the microwave range and neighboring frequency ranges are used particularly often in non-contact measurement methods. The invention is based on such a level measuring device and a microwave transmitting device used therein.

Of course, not only can the fill level of a medium in a container be determined with a level measuring device using the radar principle and a corresponding microwave transmitting device, but rather arbitrary distances from surfaces to the "level measuring device" or to the microwave transmitting device, which reflect microwaves emitted from the measuring device or from the transmitting device; nevertheless, a level measuring device or a microwave transmitting device for such a level measuring device are the topics of discussion.

A level measuring device of this type has a microwave transmitting device, wherein the microwave transmitting device includes an electronic device for generating microwave signals, a waveguide for guiding the microwave signals and a microwave emitter, wherein the microwave emitter couples the microwave signals into the waveguide. These microwave signals are guided by the waveguide and are emitted in the container in which the medium whose level is to be determined is found. These microwave signals are reflected by the medium in the container and return in the waveguide to the microwave emitter, which usually acts simultaneously as a microwave receiver.

A device for determining the fill level of contents in a container is known from International Patent Application Publication WO 02/16889 A1 having a signal-generating unit that generates electromagnetic measuring signals, having a sending/receiving unit that emits the measuring signal via an antenna in the direction of the surface of the contents and receives the echo signals reflected on the surface of the contents, wherein the antenna consists of a waveguide that expands in the direction of radiation in a cavity of a defined form and having an evaluation unit that determines the fill level in the container using the running time of the measuring signal. This level measuring device reduces deposits, i.e., that the deposit of a medium on the device is nearly eliminated in that a dielectric filling material is provided that at least partially fills the waveguide and nearly completely fills the expanded cavity of the antenna.

U.S. Pat. No. 6,987,481 B2 discloses a radar level measuring device that is capable of generating and receiving an elliptical polarized wave with a directional coupler. The radar level measuring device further has a waveguide closed on one side, which is cast with a casting compound.

Level measuring devices known from the prior art have a disadvantageous size, in particular when there is a shortage of space at the mounting site of the measuring device, access to the mounting site is confined or the cavity to be measured has smaller dimensions. This size is limited downward to a minimum in that, at a given frequency of the used microwave radiation, the stripline and/or waveguide components normally used for guiding and integrating the used microwave radiation must have a minimum size, so that the stripline or waveguide components are capable even of guiding the microwave radiation at low loss.

SUMMARY OF THE INVENTION

Thus, a primary object of the invention is to provide a microwave transmitting device and a level measuring device by using such a microwave transmitting device that is particularly compact and economical.

The above derived and shown object is met based on the microwave transmitting device described in the introduction in that the microwave emitter and the electronic device have a casting.

Since the microwave emitter and the electronic device have a casting, the surprising advantage is that the microwave transmitting device can be designed in a more compact manner, since the minimum size of the components used to guide the used microwave radiation is reduced at a given frequency of the used microwave radiation due to the casting compound. This effect can be seen in striplines, but a particularly large impact can be seen, however, in the use of waveguides. This effect is caused in that the casting compound used in the casting has a higher relative permittivity—also called dielectric constant—than the air that surrounds the electronic device in the prior art. Depending on the geometry of a waveguide, each waveguide has a so-called threshold frequency. Large waveguides have a smaller threshold frequency. Signals having a frequency below the threshold frequency are strongly damped and are practically cannot be propagated in the waveguide. If the relative permittivity of the casting compound of a waveguide is increased, its threshold frequency is reduced. At a given working frequency of a microwave transmitting device, it thus results that the constructional dimensions of the wave-guiding components can be reduced when using a casting compound with increased relative permittivity.

The reduction of the minimum size in waveguides acts as an example here for how the casting with a casting compound that has a higher relative permittivity than air or the otherwise normal medium surrounding the electronic device reduces the minimum size of a component of the electronic device. In a round waveguide filled with air having a diameter of 31 mm, there is a threshold frequency of about 5.7 GHz. A casting compound that has been shown to be particularly suitable is a transparent silicone rubber having a relative permittivity of about 2.3 at frequencies in the range of 5.7 GHz to about 26 GHz. If a round waveguide is cast with this casting compound, then a diameter of the round waveguide of about 21 mm is sufficient to retain a frequency of 5.7 GHz. The scale factor is the reciprocal of the root of the relative permittivity of the casting compound. A comparable reduction of the minimum size using casting can also apply to further components of the electronic device and the microwave emitter; the invention takes advantage of this.

According to an advantageous further development of the invention, it is provided that the microwave emitter and the electronic device are arranged on a common printed circuit board and have a common casting.

In that the electronic device and the microwave emitter are arranged on a common printed circuit board and these are surrounded by a common casting, a particularly compact construction of the microwave transmitting device according to the invention can be achieved. The necessary electric connections between the electronic device and the microwave emitter can, in this design, be made particularly short and space-saving. In the production of the level measuring device, there are also advantages. In particular, only one printed circuit board needs to be produced and assembled with components, through which the number of steps that are necessary for production is reduced. As an alternative to a common printed circuit board, the microwave emitter and the electronic device can be arranged on two or more printed circuit boards that are located immediately next to one another and additionally have a common casting; the basic advantage also remains in this modular variation.

An advantageous design of the invention is wherein the waveguide, the microwave emitter and the electronic device have a common casting. Due to this common casting of the waveguide, the microwave emitter and the electronic device, there is an advantage primarily in the production of the microwave transmitting device that all three components can be cast in one common step. Furthermore, the common casting increases the stability of the entire microwave transmitting device, through which the microwave transmitting device is less sensitive to mechanical stress, such as, e.g., shaking and vibrations.

According to a particularly advantageous further development of the invention, it is provided that the waveguide has a termination. The termination closes the waveguide on the process side and, in this manner, guarantees that the medium found in the container does not come into contact with parts of the microwave transmitting device—apart from the termination. Since the termination represents the interface between the waveguide and the medium found in the container, the termination is formed of a material that is permeable to the radiation generated by the electronic device. For example, PTFE (polytetrafluoroethylene) is suitable here.

Furthermore, it is advantageous, when the relative permittivity of the casting compound corresponds to the relative permittivity of the termination. Leaps in the relative permittivity in the direction of propagation of the microwave radiation are avoided here, which otherwise lead to undesirable reflections. The matching does not have to be exact. An approximate matching is also normally adequately sufficient in avoiding the reflection at leaps in the relative permittivity.

Preferably, it is provided that the center frequencies of the used microwave signals lie in the range of 1 GHz to 100 GHz. In a particularly advantageous design of the invention, the center frequencies of the used microwave signals lie in the range of 4 GHz to 6 GHz, in particular of 5 GHz.

A particular advantage can be achieved in that the casting is used as a measure for implementing explosion protection, e.g., for implementing intrinsic safety if this is required for application. Since radar-based level measuring devices—and thus, also microwave transmitting devices—are used in very different process surroundings, they need to have safety characteristics that are compatible with the corresponding application, for example, need to be designed explosion-proof, i.e., is not permitted to have an ignition source in the presence of an explosive atmosphere. The ignition protection type intrinsic safety is based on the limitation of electric energy within operating means and connection lines that are subject to an explosive atmosphere, at a level below which ignition can occur either by spark formation or heating. Regulations for the construction and testing of intrinsically safe operating means that are intended for use in areas at risk of gas explosion, as well as associated operating means that are intended for connection to intrinsically safe circuits that are lead into such areas are specified by the standard EN 60079-11 "Explosive Atmospheres—Part 11: Device Safety by means of Intrinsic Safety "i"". This standard also applies to electric operating means or parts of electric operating means that are found outside of the area at risk of gas explosion or are protected by a different type of ignition protection according to EN 60079-0, insofar as the intrinsic safety of the electric circuit in the area at risk of gas explosion can depend on the design and construction of this electric operating means or parts of this electric operating means.

In another embodiment, the casting implements an encapsulation in the sense of ignition protection. Encapsulation as a type of ignition protection is also called "Ex-m" ignition protection. In encapsulation in the sense of ignition protection, components that might represent a potential ignition source are coated with a casting compound suitable for the application. This measure ensures that the surrounding explosive atmosphere does not come into contact with these components. In encapsulation as a type of ignition protection, the surface temperature of the encapsulation must not reach the ignition temperature of the surrounding explosive atmosphere should an expected error occur. The standard EN 60079-18 "Explosive Atmospheres—Part 18: Device Protection using Encapsulation "m"" specifies the requirements for equipment of this type of ignition protection. In the best case, the casting is provided in such a manner that requirements from multiple protection standards can be met.

The above described and shown object is met based on the level measuring device described in the introduction also in that the microwave transmitting device used by the level measuring device is designed as described above, which also allows for level measuring devices to be produced with reduced dimensions and costs.

According to an advantageous further development of the invention, it is provided that the level measuring device has a pressure-proof casing, the microwave transmitting device is arranged within the pressure-proof casing, the pressure-proof casing has a radiation-permeable process window and the waveguide joins the microwave emitter with the radiation-permeable process window. The radiation-permeable process window can, in particular, be formed by a termination as described above.

The pressure-proof capsule is a further possible ignition protection. In this type of ignition protection, also called "Ex-d", the explosion protection is ensured in that possible explosions occurring within the casing are shielded by the pressure-proof casing in such a manner that an explosive atmosphere present outside of the pressure-proof casing is not ignited. Feed-throughs in the wall of the casing thus have to have flashback resistant gaps. The surface temperature of the casing also must not reach the ignition temperature of the surrounding explosive atmosphere at the occurrence of an expected error. The standard EN 60079-1 "Explosive Atmospheres—Part 1: Device Protection using Pressure-Proof Casing "d"" specifies the requirements for equipment of this type of ignition protection.

Microwave signals coupled into the waveguide from the microwave emitter are lead from the waveguide to the radiation-permeable process window and emitted through the radiation-permeable process window into the container, in which the medium is found whose fill level is to be determined. In order to make the emission of the microwave signals into the container possible, the radiation-permeable process window is permeable to at least the given range of the electromagnetic spectrum that the level measuring device can emit with the microwave emitter. These microwaves are reflected by the medium in the container and make their way, via the radiation-permeable process window and the waveguide, back to the microwave emitter, which generally simultaneously also acts as a microwave receiver.

The radiation-permeable process window does not have to be arranged on the process-side end of the waveguide, but can be inserted at any point between the two ends of the waveguide in the waveguide. In particular, the waveguide can be formed here in multiple parts. For example, the waveguide can have a device-side part that is cast with casting compound and is terminated by the radiation-permeable process window. A process-side part of the waveguide is attached to the radiation-permeable process window in this design, which can also be cast.

Since both the electronic device as well as the microwave emitter are arranged in the pressure-proof casing, no complicated cable feed-throughs are required through the pressure-proof casing for connecting the electronic device to the microwave emitter.

An advantageous design of the invention is wherein the casting completely fills the inner space of the pressure-proof casing. A complete filling of the inner space of the pressure-proof casing with casting compound increases the stability of the entire level measuring device. In particular, components of the level measuring device arranged inside of the pressure-proof casing are particularly protected against being shaken loose by vibrations or the like.

According to a particularly advantageous further development of the invention, it is provided that the radiation-permeable process window is a glass window. The material glass is particularly suitable for the radiation-permeable process window of the explosion-proof device according to the invention. Glass is not only permeable in a large range of the spectrum of electromagnetic radiation, but can also be doped with appropriate additives, i.e. can be made impermeable for a range of the spectrum of electromagnetic radiation that is not used, so that the characteristics of the radiation-permeable process window can be specifically adapted to the application, in particular, different refractive indexes can be implemented in this manner. Furthermore, glass can be chosen from a large variety of known glass having desired characteristics. Additionally, manageable material costs are a result of the use of glass for the radiation-permeable process window.

It has been seen to be of particular advantage when the glass window has metal-fused glass. Metal-fused glass is thermally pre-stressed special glass for process observation. During production, a glass pane is melted into a metal ring and is permanently joined to it. Different thermal expansion coefficients of glass and metal cause a homogeneous state of compressive stress in the entire glass body. An advantage that results from the use of metal-fused glass for the radiation-permeable process window is that metal-fused glass only has surface cracks in the event of damage, but total failure does not normally occur.

According to a further preferred design of the invention, it is provided that the level measuring device has an output device, for example formed by a bus interface. Data or—after successive evaluation or pre-evaluation—information collected by the explosion-proof device according to the invention can be comfortably and safely issued via an output device in the form of a bus interface, a display or a remote connection.

In detail, there are a number of possibilities for designing and further developing the level measuring device according to the invention as will be apparent from the following detailed description of preferred embodiments of the invention in conjunction with the accompanying drawing.

DETAILED DESCRIPTION OF THE INVENTION

Figures 1A, 1B:
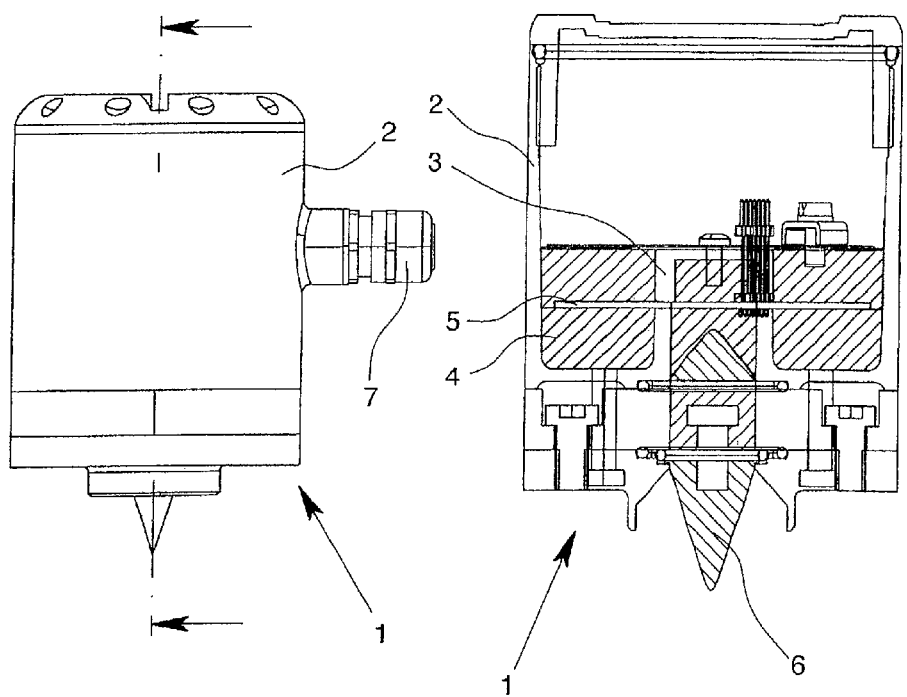
FIGS. 1a & 1b are, respectively a side elevational view and a sectional view taken along the longitudinal axis of a level measuring device according to the invention
Figure 2A:
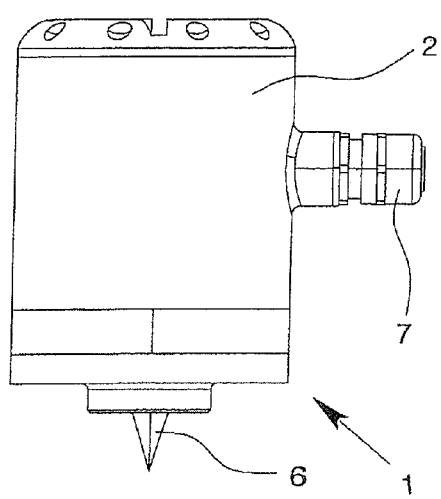
FIGS. 2a-2d are, respectively, a side elevational view, a perspective view, a termination end elevational view and a elevational view at right angles to that of FIG. 2a, of the level measuring device according to the invention.
Figure 2B:
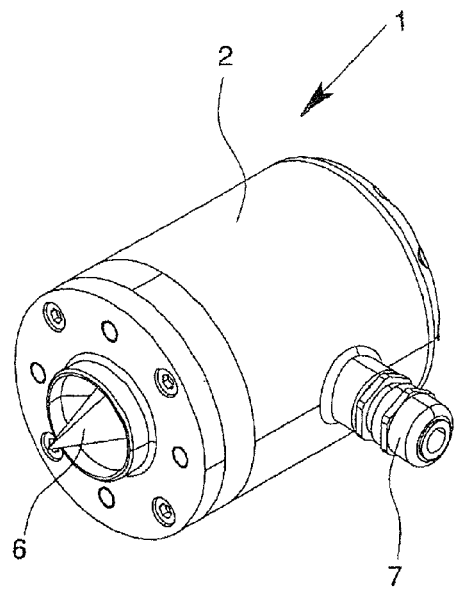
Figure 2C:
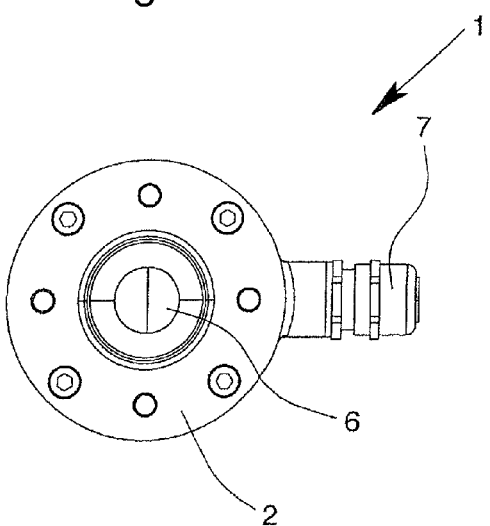
Figure 2D:
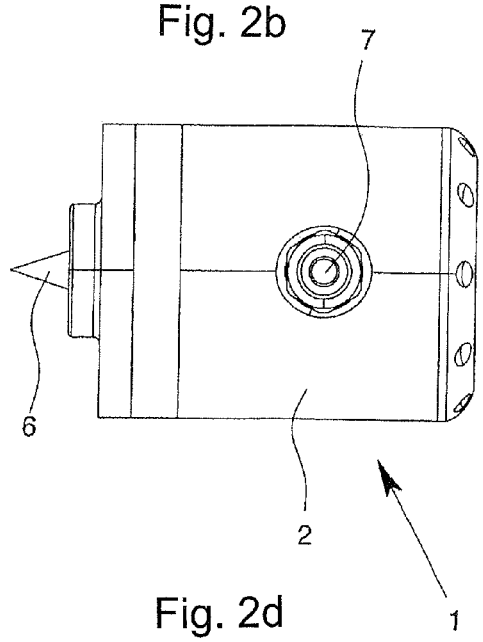

The FIG. 1b shows an inner construction of an embodiment of a level measuring device 1 according to the invention having a microwave transmitting device according to the invention. The level measuring device has a pressure-proof casing 2, which is capable of shielding explosions occurring within the pressure-proof casing 2 from the surrounding atmosphere. A waveguide 3 for guiding microwave signals is arranged inside of the pressure-proof casing. The waveguide 3 is filled and surrounded by a casting 4, i.e., a potting. The printed circuit board 5 is also surrounded by the casting 4. A microwave emitter and an electronic device are arranged on the printed circuit board 5. Microwave signals generated by the electronic device are guided to the termination 6 using the waveguide 3. The termination 6 provides for precise emission of the microwave signals in the direction of the process to be observed. The termination 6 consists of a radiation-permeable material, presently PTFE (polytetrafluoroethylene), other terminations not shown here are, for example, of PEEK (polyether ether ketone).

The microwave transmitting device is designed intrinsically safe, and thus fulfills the respective standards for this type of ignition protection.

Microwave emissions coming from the process can reach the microwave emitter from the termination 6 via the waveguide 3. Here, the microwave emitter also acts as a receiving unit. The level measuring device 1 according to the invention has an output device 7 for exchanging data with an external control and evaluation device, which is not shown.

It can be seen in the sectional view of FIG. 1b that the pressure-proof casing 2 of the level measuring device 1 is not completely filled with the casting 4. For this reason, there is an air space that is not filled with casting compound within the pressure-proof casing 2 above the casting 4. According to a further design of the level measuring device 1 according to the invention, the pressure-proof casing 2 can also be completely filled with casting/potting compound. The air space can also be filled with other media instead of casting compound or can be evacuated. Chemically inert materials are particularly suitable for filling the air space, since chemical reactions of the fill medium with the material of the pressure-proof casing 2 and the other contents of pressure-proof casing 2 can be effectively avoided in this case. Non-radioactive noble gases are particularly suitable here.

Because the printed circuit board 5, on which the microwave emitter and the electronic device are located, enclosed by such a casting 4, the mentioned components are suitable for the "Ex-i" type of ignition protection and because the printed circuit board 5 is completely cast together with the waveguide 3 and arranged within the pressure-proof casing 2, the waveguide 3, the printed circuit board 5, the microwave emitter and the electronic device are suitable for the "Ex-d" as well as the "Ex-i" types of ignition protection.

The casting 4 is designed in such a manner that it completely surrounds the printed circuit board 5 with the components arranged on it and the waveguide 3 and mechanically connects them to one another. Furthermore, the casting 4 connects the waveguide 3 and the printed circuit board 5 with the pressure-proof casing 2. Due to the printed circuit board 5, the waveguide 3 and the pressure-proof casing 2 being connected by the casting 4, the above-mentioned components of the level measuring device 1 according to the invention are mechanically stabilized and are largely protected from oscillations and vibrations.

The casting 4 is formed of an extremely homogeneous casting compound, which, in particular, has no bubbles or impurities. The casting/potting compound of the casting 4 does not have only a particularly good cohesion that gives it particularly stability, but also has excellent adhesion qualities. The adhesion qualities of the casting guarantee a reliable and nearly gap-free connection between the casting 4 and the surfaces of the components coming in contact with the casting compound. It is also relevant that the casting 4 fills the hollow space within the waveguide 3 and the bordering surfaces practically gap-free, since such gaps would lead to unwanted reflections of the microwave signal within the waveguide 3.

FIGS. 2a-2d show the level measuring device 1 according to the invention in four different views. In these views, the side arrangement of the cable feed-through 7 can particularly be seen. The tapered termination 6 can be seen on the side of the level measuring device 1 facing the process to be monitored. The level measuring device, here, has a data interface that complies with the communication standard PROFIBUS-PA, but other communication standards can also be implemented in the same manner.

What is claimed is:

1. Microwave transmitting device for a level measuring device, comprising:
    an electronic device for generating microwave signals,
    a microwave emitter,
    a printed circuit board on which both said electronic device and said microwave emitter are arranged, and
    a waveguide for guiding said microwave signals, said microwave emitter coupling said microwave signals into said waveguide,
    further comprising a casing in which said electronic device, said microwave emitter, and said waveguide are located,
    wherein a casting/potting compound both fills the inside of said waveguide and forms a casting,
    said casting enclosing both said microwave emitter and said electronic device, and wherein said wavequide has a termination with a relative permittivity, said termination projecting from said casing and wherein said casting/potting compound has a relative permittivity matching the relative permittivity of said termination.

2. Level measuring device with a microwave transmitting device, the microwave transmitting device comprising
    an electronic device for generating microwave signals,
    a microwave emitter, and
    a waveguide for guiding said microwave signals, said microwave emitter coupling said microwave signals into said waveguide,
    further comprising a casing in which said electronic device, said microwave emitter, and said waveguide are located,
    said waveguide having a termination with a relative permittivity, said termination projecting from said casing,
    wherein a casting/potting compound both fills the inside of said waveguide and forms a casting, said casting enclosing both said microwave emitter and said electronic device, and
    said casting/potting compound having a relative permittivity matching the relative permittivity of said termination.

3. Level measuring device according to claim 2, wherein the casing is a pressure-proof casing that has a radiation-permeable process window and wherein the waveguide joins the microwave emitter with the radiation-permeable process window.

* * * * *